(12) United States Patent
Okamura et al.

(10) Patent No.: US 7,717,780 B2
(45) Date of Patent: May 18, 2010

(54) GAME MACHINE AND GAME PROGRAM

(75) Inventors: Noriaki Okamura, Tokyo (JP); Takashi Muto, Kanagawa-ken (JP); Satoshi Hirayae, Kanagawa-ken (JP)

(73) Assignee: Konami Corporation (JP)

(*) Notice: Subject to any disclaimer, the term of this patent is extended or adjusted under 35 U.S.C. 154(b) by 810 days.

(21) Appl. No.: 11/173,140

(22) Filed: Jul. 1, 2005

(65) Prior Publication Data

US 2006/0030382 A1 Feb. 9, 2006

(30) Foreign Application Priority Data

Jul. 7, 2004 (JP) ............................. 2004-200425

(51) Int. Cl.
A63F 9/24 (2006.01)
(52) U.S. Cl. .................... 463/1; 463/2; 463/29; 463/42
(58) Field of Classification Search ..................... 463/1, 463/2, 29, 42
See application file for complete search history.

(56) References Cited

U.S. PATENT DOCUMENTS

| | | | | |
|---|---|---|---|---|
| 4,738,451 A | * | 4/1988 | Logg | ............................. 463/2 |
| 5,964,660 A | * | 10/1999 | James et al. | .................... 463/1 |
| 6,106,399 A | * | 8/2000 | Baker et al. | ................... 463/42 |
| 6,767,287 B1 | * | 7/2004 | Mcquaid et al. | ............... 463/42 |
| 6,769,771 B2 | * | 8/2004 | Trumbull | .................... 352/243 |
| 6,962,529 B2 | * | 11/2005 | Kusuda | ....................... 463/29 |
| 2004/0143852 A1 | * | 7/2004 | Meyers | ....................... 725/133 |

* cited by examiner

Primary Examiner—Peter DungBa Vo
Assistant Examiner—Omkar Deodhar
(74) Attorney, Agent, or Firm—Law Offices of Robert F. Zielinski, LLC

(57) ABSTRACT

A game machine is comprised of means for producing a field having two or more stages which are connected with each other on world coordinates, means for respectively locating two or more characters appearing in a game in the stage, means for locating an operation character, means for computing a character density in the stage where the operation character is located, means for judging as to whether or not the character density is lower than a predetermined character density, means for computing a number of short characters, and means for extracting the short characters from the stages other than the stage where the operation character is located and relocating the short characters.

5 Claims, 7 Drawing Sheets

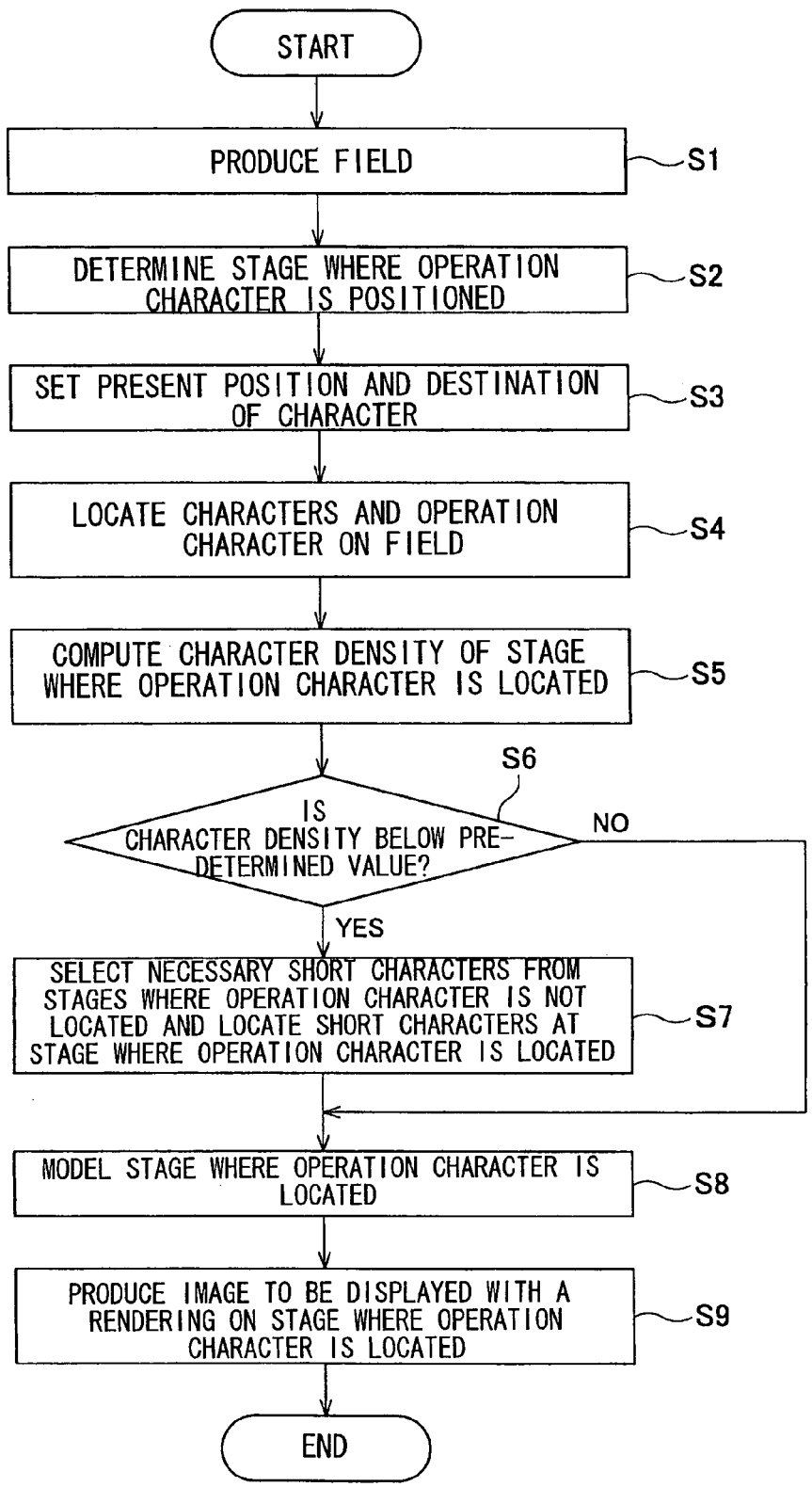

GAME MACHINE AND GAME PROGRAM

BACKGROUND OF THE INVENTION

The invention relates to a game machine and a game program for maintaining some degree of a density of locations of characters in each of two or more stages prepared in a game, where the characters are movable, so as to express a state of being alive with characters.

In such kind of conventional game machine and game program, a place where many people come and go, such as a bustling place and a campus, may be expressed in a three-dimensional virtual space. In such a case, it is necessary to maintain some degree of a density of characters which are located in a virtual space in order to express a state of being alive.

In order to maintain some degree of density of characters in each of two or more stages in a game, a number of characters to be controlled by a CPU is (number of characters necessary for maintaining character density in each stage)×number of stages.

But, with this number of characters, the CPU should simultaneously control too many characters, so that a burden of the CPU increases, and the game does not smoothly proceed.

In order to solve the above-mentioned problem, an object of the invention is to provide a game machine and game program for expressing a state of being alive without extremely increasing a burden of a CPU by maintaining some degree of character density in each of all stages where character are movable.

SUMMARY OF THE INVENTION

One aspect of the invention is a game machine, comprising:
  field producing means for setting a three-dimensional virtual space where world coordinates are set in a memory and for producing a field which is comprised of two or more stages connecting with each other on said world coordinates;
  character locating means for respectively locating two or more characters appearing in a game in said stages in said field;
  operation character locating means for locating an operation character operable by a player through a controller in said stage of said field;
  character density computing means for computing a character density in said stage where said operation character is located;
  character density judgment means for judging as to whether or not said computed character density is lower than a predetermined character density;
  short character number computing means for computing a number of short said characters when said character density was judged to be lower than said predetermined character density;
  short character extracting relocation means for extracting said computed short characters from said stages other than one where said operation character is located, and for relocating said short characters in said stage where said operation character is located; and
  image display means for displaying an image of said stage where said operation character is located on a monitor.

According to this aspect of the invention, if a character density of the stage where the operation character is located is lower than a predetermined character density, short characters are extracted from another stages and located, so that the stage where the operation character takes actions can always keep a predetermined character density even if many characters necessary for maintaining the character density for each of all stages of the field are not located, thereby easily expressing a state of being crowed or being alive.

In other words, a predetermined character density can be always maintained with a minimum number of predetermined characters in the stage where the operation character is located by moving the characters between the stage where the operation character is located and the other stages. Then, it is possible to widely decrease the characters to be simultaneously controlled by a CPU so as to decrease the burden of the CPU for smooth proceeding of the game while maintaining funs of the game, such as being alive and being crowded in stages.

Another aspect of the invention is the game machine according to claim 1, wherein said short character extracting relocation means has stage selection means for selecting said stage departing from said stage where said operation character is located by a predetermined number of stages as a stage from which said short characters are to be extracted, and short character extracting means for extracting said short characters from said selected stage.

According to this aspect of the invention, the short characters are extracted from the stages which depart from the stage where the operation character is located by a predetermined number of stages. Even if the operation character moves to an adjacent stage, it is possible to avoid an unnatural location of characters on the development of a scenario, that is, to avoid extracting the short characters which has been relocated just before from the stage as the short characters again and to avoid relocating at the stage where the operation character is located.

Besides, another aspect of the invention is game program for getting a computer to execute the following routines, comprising:
  a field producing routine for setting a three-dimensional virtual space where world coordinates are set in a memory and for producing a field which is comprised of two or more stages connecting with each other on said world coordinates;
  a character locating routine for respectively locating two or more characters appearing in a game in said stages in said field;
  an operation character locating routine for locating an operation character operable by a player through a controller in said stage of said field;
  a character density computing routine for computing a character density in said stage where said operation character is located;
  a character density judgment routine for judging as to whether or not said computed character density is lower than a predetermined character density;
  a short character number computing routine for computing a number of short said characters when said character density was judged to be lower than said predetermined character density;
  a short character extracting relocation routine for extracting said computed short characters from said stages other than one where said operation character is located, and for relocating said short characters in said stage where said operation character is located; and
  an image display routine for displaying an image of said stage where said operation character is located on a monitor.

According to this aspect of the invention, if a character density of the stage where the operation character is located is lower than a predetermined character density, short characters are extracted from another stages and located, so that the stage where the operation character takes actions can always keep a predetermined character density even if many characters necessary for maintaining the character density for each of all stages of the field are not located, thereby easily expressing a state of being crowed or being alive.

In other words, a predetermined character density can be always maintained with a minimum number of predetermined characters in the stage where the operation character is located by moving the characters between the stage where the operation character is located and the other stages. Then, it is possible to widely decrease the characters to be simultaneously controlled by a CPU so as to decrease the burden of the CPU for smooth proceeding of the game while maintaining funs of the game, such as being alive and being crowded in stages.

BRIEF DESCRIPTION OF THE DRAWINGS

FIG. 7 is a flowchart exemplarily showing procedures for adjustment of character density.

DESCRIPTION OF THE PREFERRED EMBODIMENT

Figure 1:
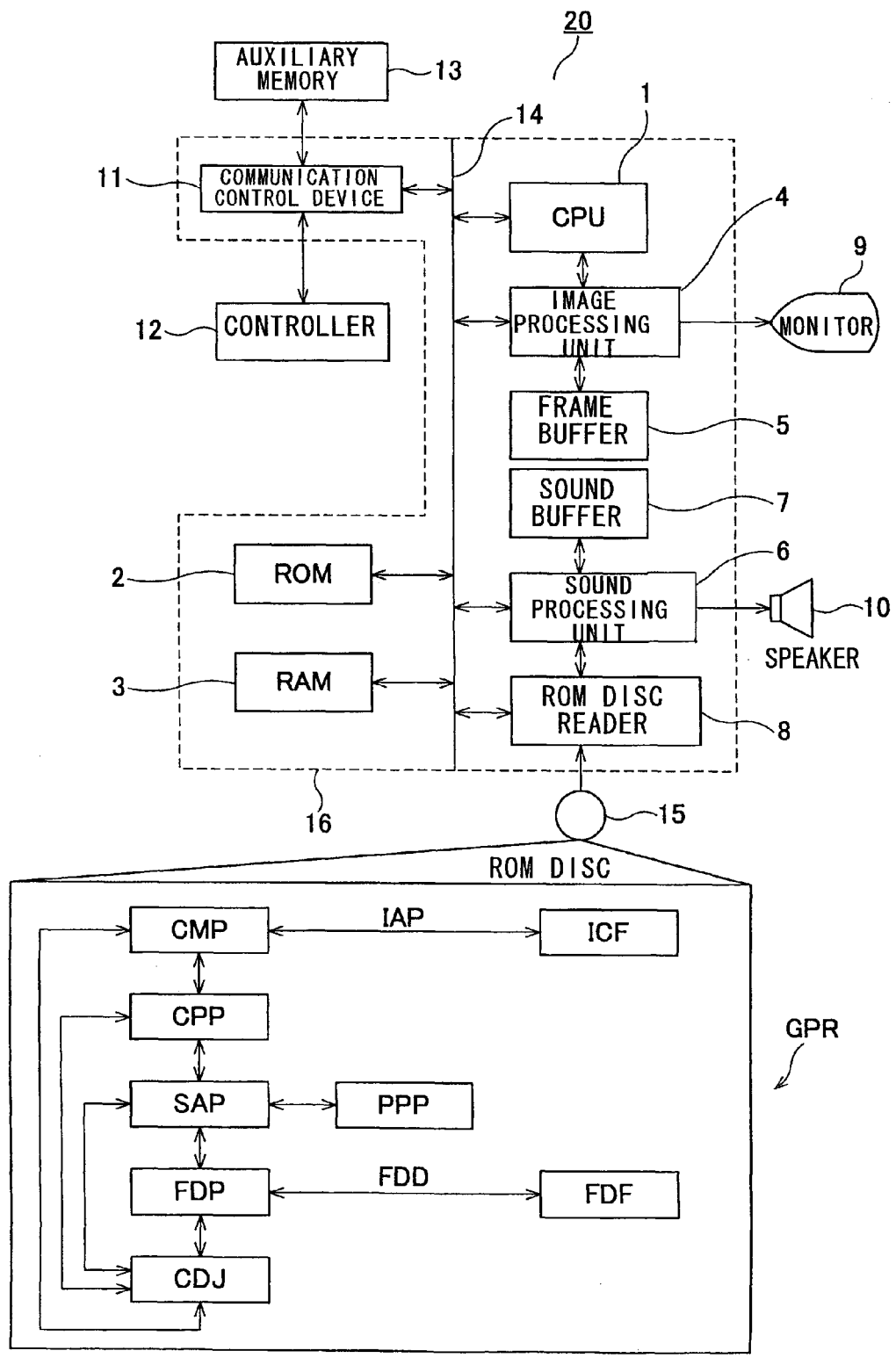
FIG. 1 is a control block diagram exemplarily showing a game machine to which the invention is applied.

A game machine 20 is one for executing a predetermined game according to game program GPR which is stored in a ROM disc 15 as a storage medium, as shown in FIG. 1. The game machine 20 has a CPU 1, main body of which is a microprocessor, a ROM 2 and a RAM 3 as main memories of the CPU 1, an image processing unit 4 and a sound processing unit 6, and buffers 5, 7 with respect to both units, and a ROM disc reader 8. An operating system which is program necessary for controlling the whole operations in the game machine is written in the ROM 2. In the RAM 3, programs and data for game comprising the program GPR which are read from the ROM disc 15 as a storage medium are written according to their necessity.

And, the image processing unit 4 receives image data from the CPU 1, and draws a game picture on the frame buffer 5, and converts the data of the drawn image into predetermined video regenerative signal, and outputs the signal to a monitor 9 with a predetermined timing. The sound processing unit 6 copies data of voice or sound, and data of a sound source which are read out of the ROM disc 15 and are stored in the sound buffer 7, and gets a speaker 10 to output. The ROM disc reader 8 reads program and data which are stored in the ROM disc 15 according to an instruction from the CPU 1, and outputs a signal corresponding to the read contents. The program GPR comprised of programs and data necessary for execution of the game is stored in the ROM disc 15. As the monitor 9 and the speaker 10, a home television receiver and a built-in speaker of the television receiver are generally used.

A communication control device 11 is connected with the CPU 1 through a bus 14, and a controller 12 as an input device and an auxiliary memory 13 are attachably and detachably connected with the device 11 through proper connection ports. The controller 12 functions as an input device, and has operation members, such as an operation key, for receiving the operation by a player.

The controller 12 outputs an operation signal corresponding to an operation through each operation member at predetermined cycles (at sixty cycles per a second, for instance), and the CPU 1 judges the state of the operation of the controller 12 on the basis of the operation signal. A plurality of the controllers 12 and the auxiliary memories 13 may be connected with the communication control device 11 in parallel.

The components in the above-mentioned structure excluding the monitor 9, the speaker 10, the controller 12, the ROM disc 15, and the auxiliary memory 13 are stored together in a predetermined housing so as to comprise a machine body 16. This machine body 16 functions as a computer.

When loading the programs which are stored in the ROM disc 15 into the RAM 3 and executing the loaded with the CPU 1 in the game machine 20 having the above-mentioned structure, a player can enjoy playing various kinds of games on a screen of the display 9.

In the game machine 20, the CPU 1 firstly executes a predetermined initialization process according to the program of the ROM 2 after a predetermined initialization operation (the operation of turning the power on, for instance). When the initialization finishes, the CPU 1 starts to read the game program GPR which is stored in the ROM disc 15, and starts game processing according to the program. When a player executes a predetermined game start operation by operating the controller 12 which is an input unit, the CPU 1 starts various controls necessary for the execution of the game according to the routines of the program GPR.

One instance of a computer through which the program according to the invention functions is the game machine 20 which is a game machine for home use. But, the game machine 20 may be a portable one. Furthermore, the game machine 20 may not a machine dedicated for a game, but may be a machine through which a general storage medium for storing music and images can be replayed. Besides, the game machine 20 may be any computer, such as a personal computer and a portable phone, through which the program can function.

Before starting this game, the game program GPR produces through the CPU 1 a field FLD where an operation character operable by a player and many characters to appear in the game are located in order to take actions according to a predetermined scenario development in the game program GPR.

In other words, a field producing program FDP of the game program GPR, which comprises a field producing means together with the CPU 1, reads field data FDD necessary for producing the filed FLD out of field data file FDF which is stored in the game program GPR through the CPU 1, and produces the field FLD in a three dimensional virtual space set in the RAM 3 on the basis of the field data FDD (Step S1 of FIG. 7).

Various kinds of programs and various kinds of data comprising the game program GPR may be stored in any method as long as they can be freely read out by a program function of the game program GPR. As the present embodiment, they may be stored in the ROM disc 15 together with the program, such as the game program GPR. Otherwise, they may be stored in an outside memory means which is independent of the game machine 1, such as a server, and may be downloaded to a memory, such as the RAM 3, by the reading program in the game program GPR through communication medium means, such as the Internet.

The program GPR in FIG. 1 shows only software elements comprising the game program GPR which are related to the invention. In fact, the game program GPR stores various programs and data including ones shown in FIG. 1 which are necessary for execution of the game with the game program GPR.

Figure 2:
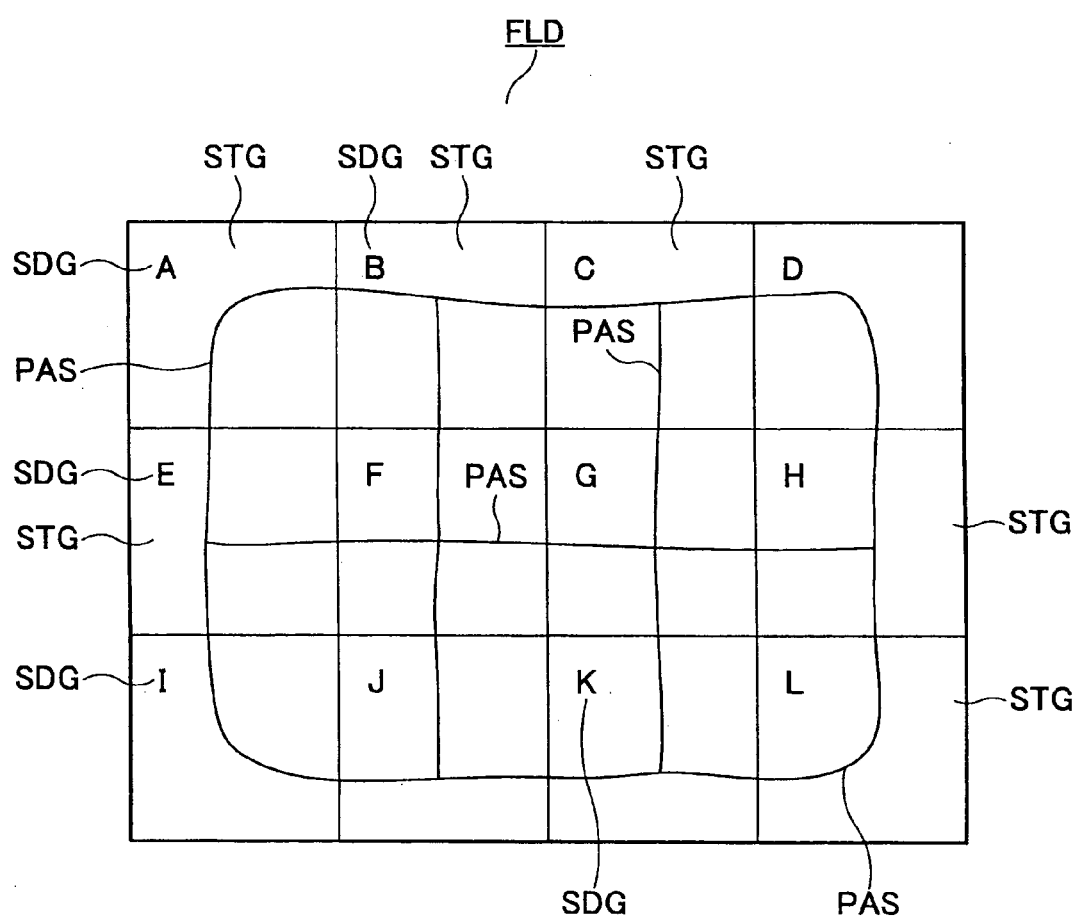
FIG. 2 is a view exemplarily showing stages comprising a field to be produced in a three-dimensional virtual space.

The field FLD produced in the RAM 3 by the field producing program FDP through the CPU 1 is comprised of two or more stages STG, and is set as spaces connecting with each other on the world coordinates in the three dimensional virtual space, as shown in FIG. 2. These stages are comprised of twelve stages attaching marks "A" through "L" thereon in case of FIG. 2. As mentioned before, stage identification marks SDG "A" through "L" are respectively attached on the stages. The more the number of stages comprising each filed FLD is, the bigger the effects of the invention are although the number of the stages comprising each field FLD is optional.

The field producing program FDP and the field data FDD set a move passage PAS in the field FLD through the CPU 1, which is a passage for the characters when moving the characters in the filed FLD, so as to communicate the respective stages STG comprising the field FLD with each other, as shown in FIG. 2. This move passage PAS is formed in the shape of a lattice with a simple line for easy explanation. In fact, a complicated move passage PAS is set in each stage STG and between the respective stages STG according to arrangement forms of fitted (background) objects of buildings, such as restaurants, schools and shops, and gardens, streets and the like to be set in the field FLD.

After producing the field FLD and the move passage PAS by the field producing program FDP, the game program GPR determines the stage STG where an operation character OCH operable by a player through the controller 12 is to be located, and a coordinate position of the operation character OCH to be located in the stage STG according to a scenario proceeding program SAP of the game program GPR which comprises an operation character locating means together with the CPU 1 (Step S2 of FIG. 7).

The game program GPR computes for determining the stage STG where the operation character OCH is to be located, and a character setting program CPP which comprises a character locating means together with the CPU 1 sets the stages STG to be located at the time of game start (present position) for the respective characters CR excluding the operation character OCH to appear in the game, and destinations which are places to be moved for the respective characters CR at the time of game start (Step S3 of FIG. 7).

Actions to be taken are given to each of the respective characters CR excluding the operation character OCH as an individual action program IAP, and the individual action programs IAP are stored in an individual character file ICF of the game program GPR every each character CR. Then, the actions of each character CR in the field FLD are controlled by a character control program CMP through the CPU 1 on the basis of the individual action program IAP for each character CR which is stored in the individual action character file ICF.

Figure 3:
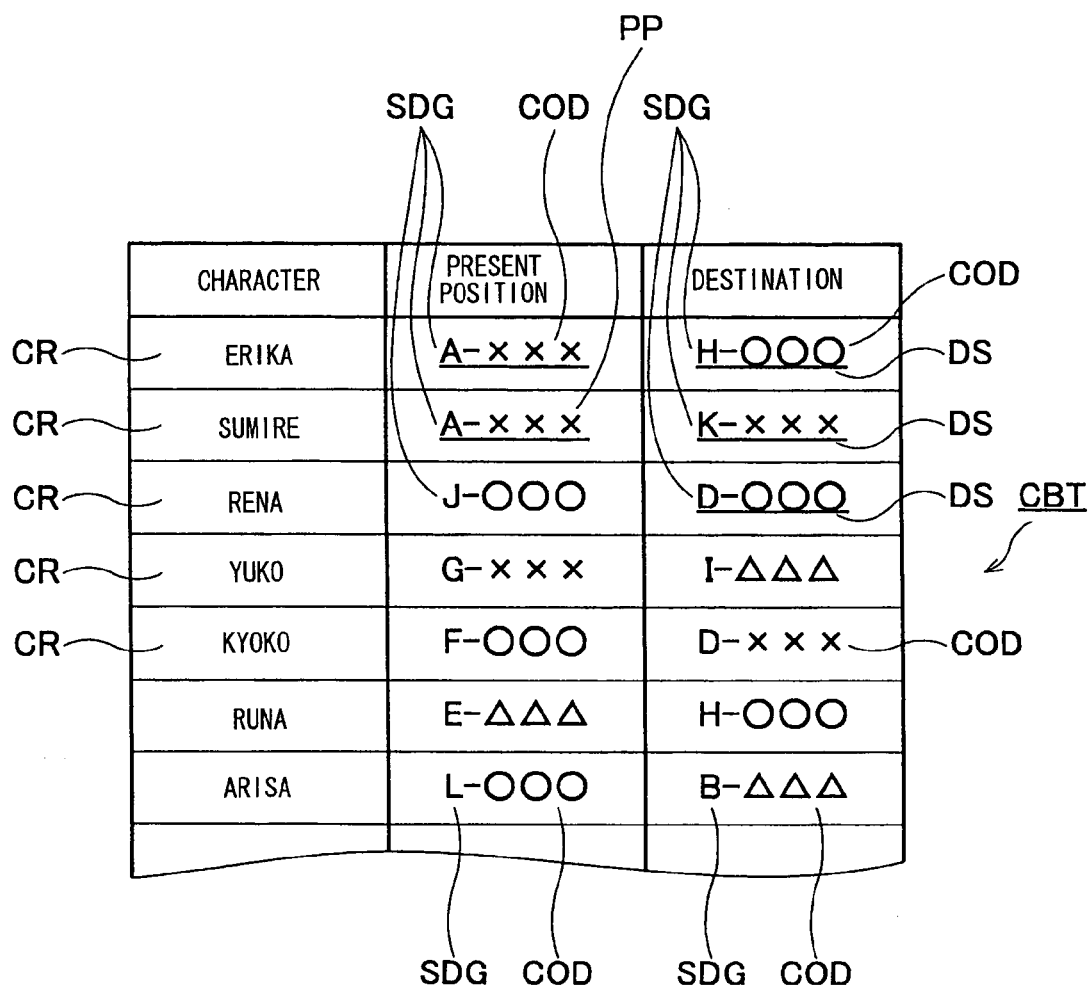
FIG. 3 is a view of an action control table for respective characters.

As shown in FIG. 3, for instance, the individual action program IAP sets both a position (present position PP) where the character CR is located in the field FLD in a point of time in a started game (including a case where a game itself is started from the first and a case where a game has already been started, and has been interrupted and the game data before interruption of the game has been stored in the auxiliary memory 13 as save data, and thereafter the game is restarted by loading the save data out of the auxiliary memory 13 into the RAM 3) and a destination DS, a place to which the character CR will go in this point of time. The individual action program IAP set for each character CR properly sets these according to a development of a scenario. Each of the present position PP and the destination DS is comprised of the stage identification mark SDG "A" through "L" for differentiating the stages STG of the field FLD and coordinate positional data COD showing the position of a character in the stage STG, as shown in FIG. 3.

The character control program CMP collects data of the stages STG where the characters are to be located (the present positions PP) and the destinations DS of the respective characters CR in a time when the game is to be started, which are determined by the individual action programs IAP of the respective characters CR, and prepares a character action control table CBT as shown in FIG. 3 and stores this table in the RAM 3. The character action control table CBT is prepared for all characters CR who are expected to have a relation to the operation character OCH in the game for some development of a scenario by the scenario proceeding program SAP. In this embodiment, the character action control table CBT is prepared for about three hundreds of characters. But, the number of the characters can be properly set according to capacities of the CPU 1 and the RAM 3 which is a memory.

After preparing the action control table CBT as shown in FIG. 3 for all characters CR who may have a relation to the operation character OCH in the game world, the character setting program CPP locates these characters CR at the coordinate positions in the field FLD which are designated as the present positions PP in the character action control table CBT (Step S4 of FIG. 7). At the same time, the character setting program CPP locates the operation character OCH at a predetermined coordinate position of a predetermined stage STG which was determined by the scenario proceeding program SAP.

Figure 4:
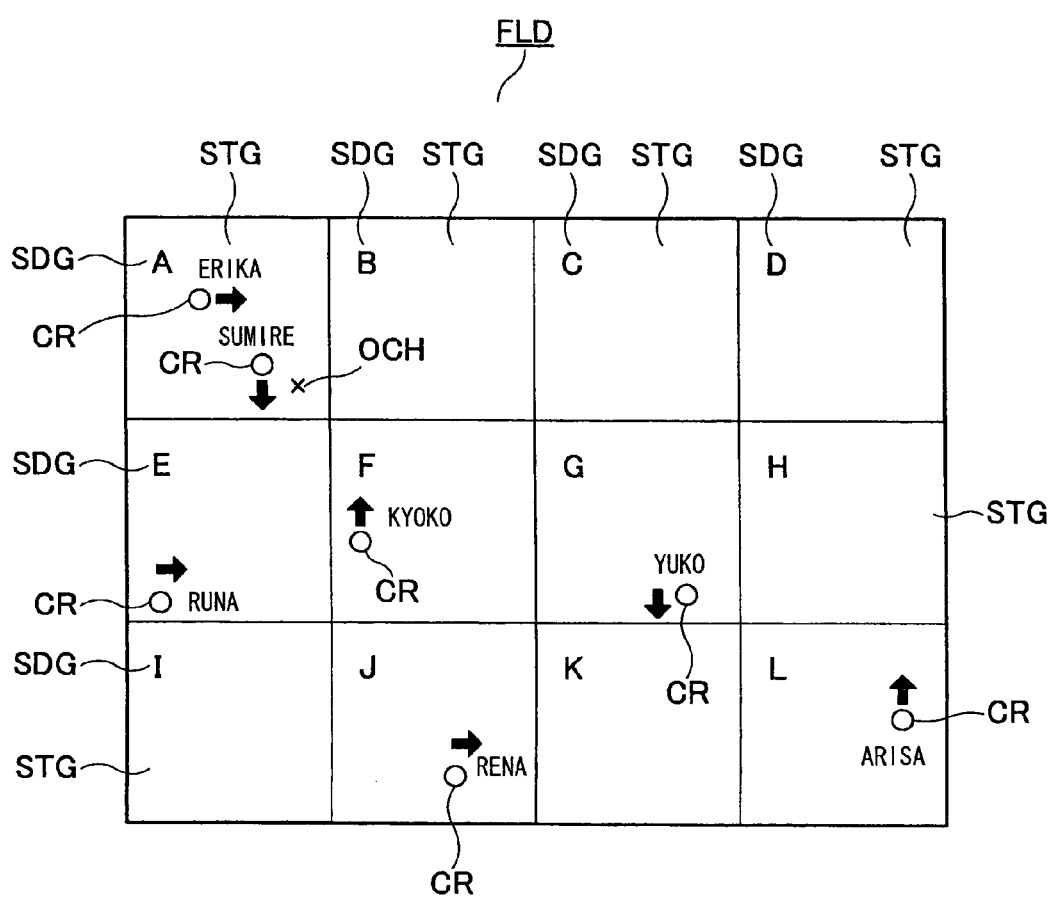
FIG. 4 is a view showing an initial location state of each character in the field of FIG. 2.

Then, all the characters CR and the operation character OCH to appear in the game world are respectively located at predetermined coordinate positions of the predetermined stages STG in the filed FLD, as shown in FIG. 4. In FIG. 4, seven characters CR excluding the operation character OCH are located for easy explanation. But, several tens of or hundreds of characters CR are located in each stage in a case of an actual game.

After locating the characters CR and the operation character OCH in the field FLD, the game program GPR computes a character density in the stage STG where the operation character OCH is located according to a character density adjustment program CDJ which comprises a character density computing means and a character density judging means together with the CPU 1 (Step S5 of FIG. 7). Then, the character density adjustment program CDJ judges whether or not the computed character density reaches the character density which has been determined for the stage STG by the game program GPR in advance (S6 of FIG. 7). This judgment is easy since the field data FD stores the character density for each stage STG as attribute data.

If many characters CR up to a certain point are not located in the field FLD of the game, such as a campus of a school and a theme park, the character density in the stage STG is unnatural as the field FLD where a game scenario is developed. In order that the whole field FLD which is comprised of many stages STG may have the character density suitable for a place which is set on the field FLD, but, it is necessary to locate extremely many characters CR in the whole filed FLD and to simultaneously control actions of these characters CR. Under this situation, the CPU 1 is extremely burdened, so that the game may not be smoothly developed.

In this explanatory embodiment, the filed FLD is a campus of a school necessitating a predetermined character density. So, it is necessary to keep a predetermined character density in all stages STG in the field FLD where the operation character OCH is movable at least while the operation character OCH is in the stage. And, a player can have a contact and a conversation with the characters CR appearing in the filed FLD through the operation character OCH and can participate in various kinds of amusements according to the game program GPR.

In case of the field in FIG. 4, for instance, only two characters are located excluding the operation character OCH in the stage STG having the identification mark SDG "A" where the operation character OCH is located at the time of game start according to the character control program CMP. But, the characters CR excluding the operation character OCH are four in the stage STG of the identification mark SDG "A" in order to have the density of characters in a campus of a school according to the filed data FDD corresponding to this stage STG. Then, the character density adjustment program CDJ judges through the CPU 1 that the character density of the stage STG of the identification mark SDG "A" where the operation character OCH is located is lower than one which has been set in advance in steps S5 and S6 of FIG. 7.

As already described, only seven characters CR excluding the operation character OCH are located in the field FLD of FIG. 4 for easy explanation. But, in the actual game, a proper number of characters, such as twenty through thirty characters (any number is possible), of several hundreds of characters CR to be located in the whole filed FLD, are located in the stage STG by the character control program CMP according to computed results by the individual action program IAP.

When being judged that the character density does not reach one which has been set for the stage STG in advance by the game program GPR, the character density adjustment program CDJ comprising a short character computing means together with the CPU 1 computes the number of the characters CR necessary to reach the character density which has been set for the stage STG, that is, computes the number of short characters CR. In case of FIG. 4, the character density according to the filed data FDD (the set character density) is four, so that the program CDJ computes the short characters as two since the presently located characters are two.

After computing the short characters CR, the character density adjustment program CDJ which comprise a short character extracting relocation means together with the CPU 1 and the character control program CMP interrupts the character control program CMP and instructs to select and collect the short characters CR from the other stages STG. Receiving this instruction, the character control program CMP which comprises a stage selecting means and a short character extracting means together with the CPU 1 selects through the CPU 1 the stages in the three dimensional virtual space which depart from the stage STG where the operation character OCH is presently located by two stages or more in a horizontal direction, referring to a state where the respective set characters CR are located in the field FLD in step S2 of FIG. 7, that is, the stages STG of the identification marks SDG "C", "D", "G", "H", "I", "J", "K", and "L" in case of FIG. 4, and extracts the characters CR which are located in the selected stages at random, referring to the present positions PP of the character action control table CBT. In case of FIG. 4, three characters CR are located in the stages STG "C", "D", "G", "H", "I", "J", "K", and "L". But, many characters CR whose actions are controlled by the character control program CMP are actually located in these stages STG, as described before, and the characters CR corresponding to the short number of characters are extracted from those many characters CR at random.

When the character control program CMP selects the stages for collecting the short characters CR, it is preferable to preclude the stage which is directly adjacent to the stage STG where the operation character OCH is located, and the stage which is within a predetermined distance in the field FLD from the stage STG where the operation character OCH is located. In other words, it is preferable that the stage from which the short characters are extracted exists at a position departing from the stage STG where the operation character OCH is located by a predetermined number of stages.

This is necessary to avoid such an unnatural state that if the operation character OCH frequently moves from some stage STG ("original stage" in this case) to a stage STG adjacent to "the original stage" ("the adjacent stage" in this case), the character CR which has been on "the original stage" is collected by the character control program CMP and is relocated at "the adjacent stage STG" in order to keep the character density.

The character control program CMP thus selects and extracts the short characters CR necessary for satisfying the character density of the stage STG where the operation character OCH is located from the peripheral stages STG at random. In case of FIG. 4, for instance, the characters CR, "YUKO" and "RENA" who have been located in the stages STG having the identification marks SDG "G" and "J" at a time of the game start are extracted.

Figure 6:
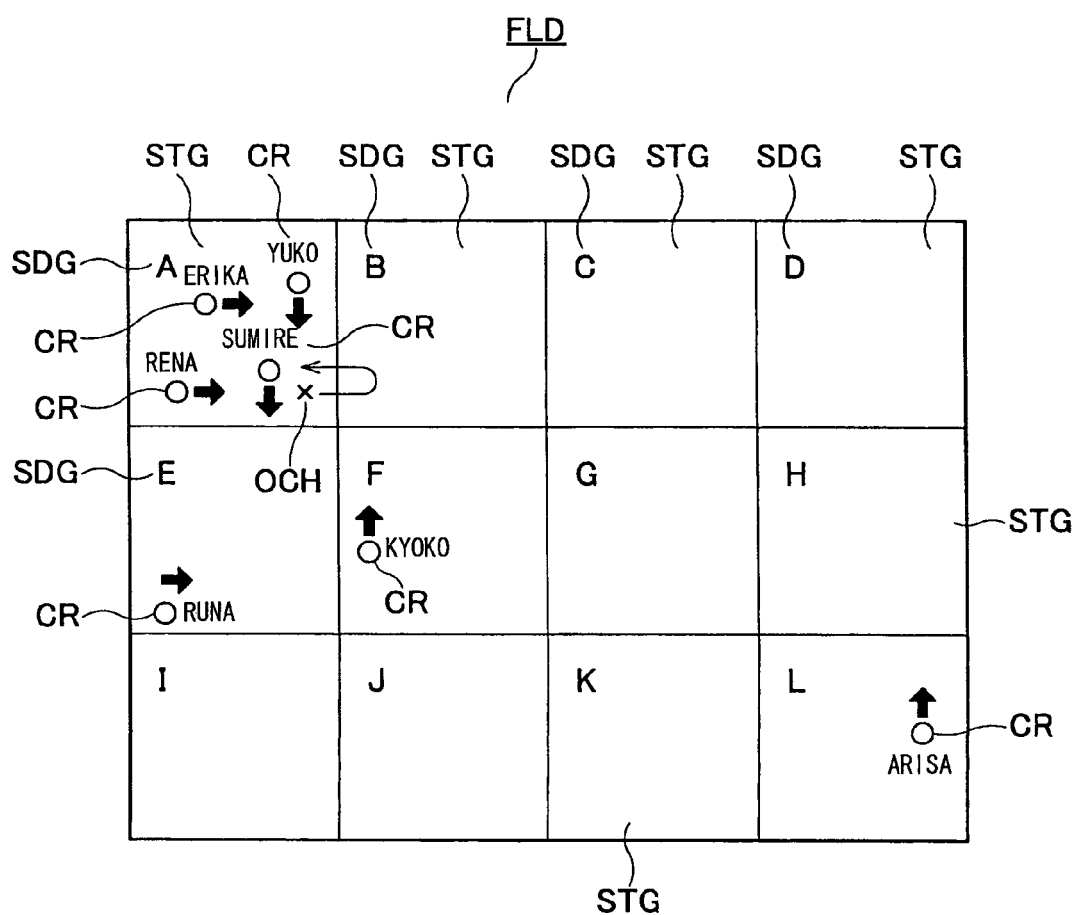
FIG. 6 is a view showing a state where short characters have been moved in the field of FIG. 4 by adjustment of the character density.

After thus extracting the short characters CR from the peripheral stages STG by the character control program CMP at random, the character density adjustment program CDJ locates through the CPU 1 two characters CR which were selected and extracted in the stage STG of the identification mark SDG "A" where the operation character OCH is located, as shown in FIG. 6. Then, the character density of the stage STG having the identification mark SDG "A" becomes four characters per stage STG with two characters CR who have been located and newly added two characters CR, so that it can satisfy the character density which is shown in the filed data FDD concerning the stage STG.

The data of the character densities which have been stored in the field data FDD as attribute data of the respective stages STGmaybe different every each stage STG. Therefore, it is possible to set the character densities of the stages STG in the same filed FLD case by case in such a manner that for instance, the character density is set to be rather smaller in the stage STG being at a periphery of a library, and the character density near a dining hall for students is set to be rather bigger than one of the peripheral stage STG.

As already mentioned above, the character density of the stage STG the identification mark of which is "A" became four characters per stage which has been changed from two characters per stage, so that this density can satisfy one in the field data FDD which is determined for the stage STG where the operation character OCH is located.

Figure 5:
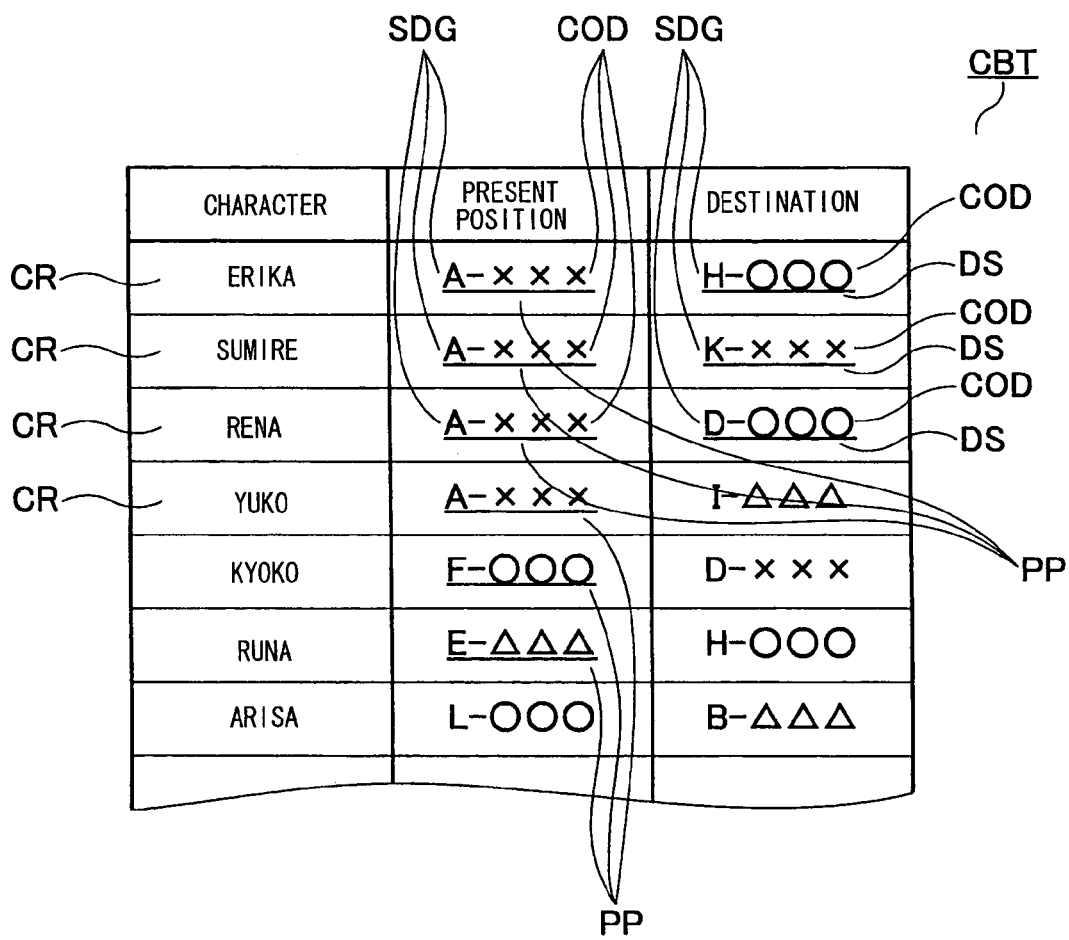
FIG. 5 is a view of the action control table where present positions of characters have been rewritten by adjustment of a character density.

After relocating the short characters CR in the stage STG where the operation character OCH is located by the character density adjustment program CDJ, the character control program CMP updates the present position PP which is stored in the character action control table CBT in the RAM 3 from the present position PP which has been set at the time of game start by the individual action program IAP to the coordinate position which was relocated in the stage STG where the operation character OCH is located concerning each of the characters CR which were extracted from the peripheral stages STG and relocated in the stage where the operation character OCH is located, as shown in FIG. 5. In case of FIG. 5, the present positions PP of "RENA" and "YUKO" are changed from the stage identification marks "J" and "G" into the stage identification mark "A". The character density adjustment program CDJ determines the coordinate positions of the respective short characters CR in the stage STG having the stage identification mark SDG "A" at random when relocating the short characters CR in the stage STG where the operation character OCH is located. Then, the determined coordinate positions of the respective short characters CR are renewed and stored as the coordinate positional data COD together with the stage identification marks SDG.

And, the scenario proceeding program SAP starts to develop a scenario in the game in the stage STG having the identification mark SDG "A", which has thus reached the predetermined character density by supplementing the short characters CR as shown in FIG. 6. The actions of all characters CR which are located in the field FLD are controlled according to the individual action program IAP which has been set for each character CR.

Then, all characters CR in the field FLD are controlled to move for the respective destinations DS which are stored in the renewed character action control table CBT of FIG. 5 on the move passage PAS by the individual action program IAP through the CPU 1.

When the development of the scenario starts in the game, an image producing program PPP of the game program GPR which comprises an image display means together with the image processing unit 4, the frame buffer 5 and the monitor 9 locates background objects for forming the stage STG where the operation character OCH is located and character objects which are comprised of polygon models of the operation character OCH and the characters CR in the RAM 3 through the CPU 1 and the image processing unit 4, and produces a two-dimensional image with a rendering on those located objects by a virtual camera (not shown) so as to display on the monitor 9 through the frame buffer 5.

Then, the image displayed on the monitor is produced on the basis of the three-dimensional models in the stage STG having the character density which has been determined in the field data FDD, so that it is possible to represent being alive and being crowded which is expected in the stage STG.

When the character density of the stage STG where the operation character OCH is located is judged to have reach the character density which has already determined by the game program GPR for the stage STG in Step S6 of FIG. 7, the program immediately enters Step S8, and for the stage STG where the operation character OCH is located, the background objects for forming the stage. STG, such as buildings and trees, and the character objects which are formed with polygon models of the operation character OCH and the characters CR are located in the RAM 3, and the two-dimensional image of those located objects is computed and obtained with a rendering by a virtual camera so as to display on the monitor 9 through the frame buffer 5. The methods of computing and obtaining of the two-dimensional image are the method with a virtual camera, and well-known various kinds of rendering methods.

When extracting the short characters CR from the other stage STG by the character density adjustment program CDJ, the character density of the stage STG from which the short characters CR have been extracted ("the extracted stage" in this case) may not keep the character density which has been originally determined in the field data FDD for "the extracted stage STG" due of this lack of extracted characters CR. "The extracted stage STG" departs from the stage STG where the operation character OCH is presently located ("the present stage" in this case) by a predetermined distance in the filed FLD in the three-dimensional virtual space, and it is necessary to pass for the operation character OCH one or more stages of the other stages between "the present stage STG" and "the extracted stage" in order to move the operation character OCH from "the present stage" to "the extracted stage". Then, the operation character OCH which has moved does not immediately enter "the extracted stage" which character density had gone down, so that the character density in the next stage STG is not widely decreased.

As already mentioned, the individual action program IAP which is set for each character CR determines the destination DS for each of all characters CR in the field FLD, and the character control program CMP controls each of all characters CR to move for the destination DS through the CPU 1. Therefore, each character CR is controlled to move for the destination DS irrespective of presence of the operation character OCH if the operation character OCH does not speak to the character CR for negotiations by instruction from the player through the controller 12.

Even if the operation character OCH once enters the stage STG having the stage identification mark "B" from "A", and thereafter the operation character OCH immediately goes back to the stage "A", all characters CR in the field FLD including the stage STG "A" are always controlled to move for the respective destinations DS on the move passage PAS Therefore, the respective characters CR are controlled to move for the respective destinations on the move passage PAS even during movement of the operation character OCH between the stages STG irrespective of the movement of the operation character OCH between the stages STG.

Even if the operation character OCH goes back to "A" stage STG again, the actions of each character are not reset, and each character does not take actions which are different from ones which each character has taken when the operation character OCH has left the stage STG. That is, the actions of each character CR are consistently unchanged, thereby naturally expressing the actions of each character CR.

The scenario proceeding program SAP thus develops the scenario in such a manner that the operation character OCH moves between the respective stages STG in the field FLD. When moving the operation character OCH in the stages, the character density adjustment program CDJ adjusts the character density of the stage STG to which the operation character moved through the CPU 1, as already mentioned. By doing so, the character density of the stage STG where the operation character OCH has newly entered is controlled to become the character density which has been determined for this stage STG in the filed data FDD. Even if the total number of characters in the field FLD does not reach the number of characters CR with which the character densities of the respective stages of the whole field FLD can be simultaneously satisfied, the short characters CR are extracted from the stages STG other than the stage STG where the operation character OCH is located, and are relocated at the stage STG where the operation character OCH is located, so that a player can feel as if the character density were satisfied in all stages STG. That is, the character density can be maintained in the filed FLD in a good state with a small number of characters CR.

By thus moving the characters CR between the stage STG where the operation character OCH is located and the other stages STG, the number of the characters to be originally controlled by the CPU 1 can be widely decreased in comparison with a number of characters necessary at the time when simultaneously respectively maintaining predetermined character densities in all stages STG, that is, (number of characters necessary for maintaining a character density in each stage)×number of stages.

And, a predetermined character density can be always maintained with a minimum number of predetermined characters CR in the stage STG where the operation character OCH is located. Then, it is possible to widely decrease the characters to be simultaneously controlled by the CPU 1 so as to decrease the burden of the CPU for smooth proceeding of the game while maintaining funs of the game, such as being alive and being crowded in stages.

In the above-mentioned embodiment, the CPU 1 comprises a game control unit, and the combination of the CPU 1 and specific software comprises various kinds of means of the game control unit, but at least a part of these means may be replaced by a logical circuit. Besides, the invention may be comprised as variously scaled game systems in addition to as a game system for home use.

The present invention has been explained on the basis of the example embodiments discussed. Although some variations have been mentioned, the embodiments which are described in the specification are illustrative and not limiting. The scope of the invention is designated by the accompanying claims and is not restricted by the descriptions of the specific embodiments. Accordingly, all the transformations and changes within the scope of the claims are to be construed as included in the scope of the present invention.

INDUSTRIAL APPLICABILITY

The invention can be utilized as an electronic game equipment using a computer, and game program for amusement for getting a computer to execute.

The invention claimed is:

1. A game machine, comprising:
field producing means for setting a three-dimensional virtual space where world coordinates are set in a memory and for producing a field which is comprised of two or more stages connecting with each other on said world coordinates, in said each stage, a character density is individually set;
character locating means for respectively locating two or more characters appearing in a game in said stages in said field;
operation character locating means for locating an operation character operable by a player through a controller in said stages of said field;
character locating means for respectively locating characters excluding said operation character which appear in a game world on said stages on said field;
a number of said characters to be located on said field by said character locating means being lower than a number of said characters necessary for keeping a predetermined character density which is set on each of said stages so as to be simultaneously satisfied in all stages;
character density computing means for computing a character density in said stage where said operation character is located;
character density judgment means for judging as to whether or not said computed character density is lower than a predetermined character density which was set for said stage;
short character number computing means for computing a number of short characters when said character density was judged to be lower than said predetermined character density;
short character extracting relocation means for extracting a number of said characters which corresponds to said computed number of short characters from one or more of said stages where said operation character is not located, and for relocating said extracted characters in said stage where said operation character is located; and
image display means for displaying an image of said stage where said operation character is located on a monitor;
whereby even if the total number of said characters in said field does not reach a number of said characters with which said character densities of the respective stages of the whole field can be simultaneously satisfied, characters are exchanged between said stage where said operation character is located and the other stages so as to produce a result as if said character density is satisfied in all stages with small computational load.

2. The game machine according to claim 1, wherein said short character extracting relocation means has stage selection means for selecting one or more stages located two or more stages away from said stage where said operation character is located from which said number of said characters are to be extracted, and wherein said short character extracting relocation means extracts said number of said characters from said one or more extracted stages.

3. A computer readable medium storing a game program for getting a computer to execute the following routines, comprising:
a field producing routine for setting a three-dimensional virtual space where world coordinates are set in a memory and for producing a field which is comprised of two or more stages connecting with each other on said world coordinates;
a character locating routine for respectively locating two or more characters appearing in a game in said stages in said field;
an operation character locating routine for locating an operation character operable by a player through a controller in said stages of said field;
a character density computing routine for computing a character density in said stage where said operation character is located;
a character density judgment routine for judging as to whether or not said computed character density is lower than a predetermined character density;
a short character number computing routine for computing a number of short characters when said character density was judged to be lower than said predetermined character density;
a short character extracting relocation routine for extracting a number of said characters corresponding to said computed number of short characters from one or more of said stages where said operation character is not located, and for relocating said extracted characters in said stage where said operation character is located; and
an image display routine for displaying an image of said stage where said operation character is located on a monitor.

4. A game machine comprising:
a field producing unit that sets a three-dimensional virtual space where world coordinates are set in a memory and produces a field which is comprised of two or more stages connecting with each other on said world coordinates;

a character locating unit that respectively locates two or more characters appearing in a game in said stages in said field;

an operation character locating unit that locates an operation character operable by a player through a controller in said stages of said field;

a character density computing unit that computes a character density in said stage where said operation character is located;

a character density judgment unit that judges as to whether or not said computed character density is lower than a predetermined character density;

a short character number computing unit that computes a number of short said characters when said character density was judged to be lower than said predetermined character density;

a short character extracting relocation unit that extracts a number of said characters corresponding to said computed number of short characters from one or more of said stages where said operation character is not located, and relocates said extracted characters in said stage where said operation character is located; and an image display unit that displays an image of said stage where said operation character is located on a monitor.

5. The game machine according to claim 4, wherein said short character extracting relocation unit has a stage selection unit for selecting one or more stages located a predetermined number of stages away from said stage where said operation character is located from which said number of said characters are to be extracted, and where said short character extracting relocation unit extracts said number of said characters from said one or more extracted stages.

* * * * *